(No Model.)
A. P. AVERY.
ATTACHMENT FOR VAPOR BURNERS.
No. 312,065. Patented Feb. 10, 1885.
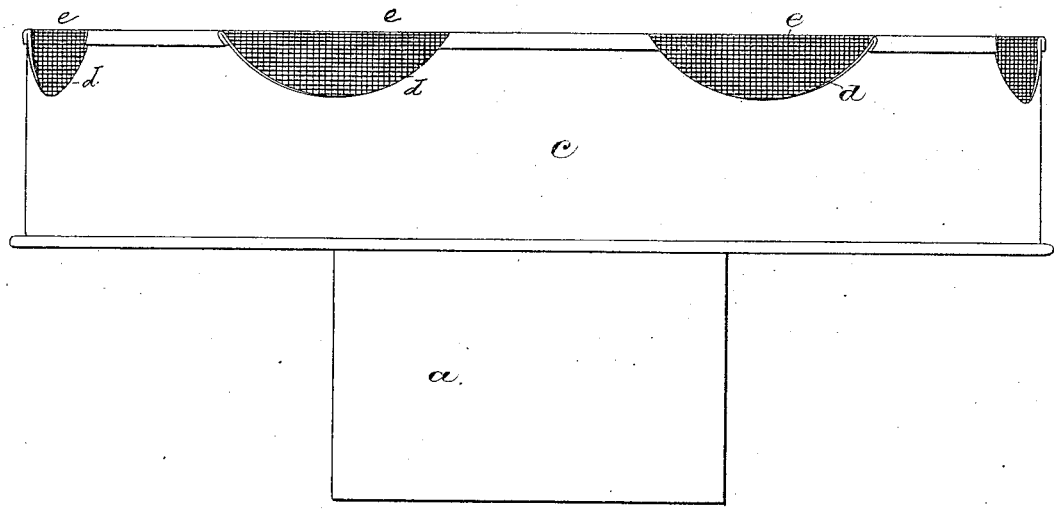
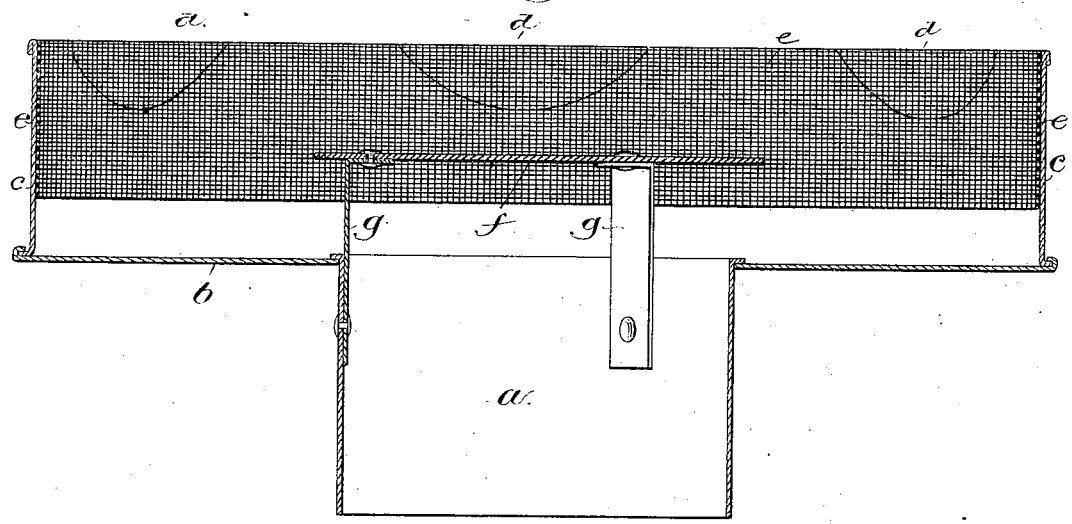
Witnesses.
John F. C. Brinkerh
W. H. Sigston
Inventor.
Amos P. Avery.
by Crosby Gregory
attys.

UNITED STATES PATENT OFFICE.

AMOS P. AVERY, OF PLAIN CITY, OHIO.

ATTACHMENT FOR VAPOR-BURNERS.

SPECIFICATION forming part of Letters Patent No. 312,065, dated February 10, 1885.

Application filed August 25, 1884. (No model.)

*To all whom it may concern:*

Be it known that I, AMOS P. AVERY, of Plain City, county of Madison, State of Ohio, have invented an Improvement in Attachments for Vapor-Burners, of which the following description, in connection with the accompanying drawings, is a specification, like letters on the drawings representing like parts.

My invention relates to an attachment to be used in connection with a vapor-burner or similar apparatus using liquid or gaseous fuel to produce a flame for heating or cooking purposes. Apparatus of this kind as heretofore constructed has either consisted of more or less complicated and expensive arrangements for utilizing the heat, as found in oil-stoves, or of a simple support for holding a vessel above the flame, so as to be affected by the heat thereof. In the latter class of apparatus the flame is exposed to currents of air, which divert the heat from the object desired to be heated, and, furthermore, when the flame is unobstructed its heat is concentrated in a small space, so that it does not produce the best effect.

My invention consists in a simple appliance to be used in connection with a burner to support a cooking or other utensil to be heated, and properly distribute the heat thereon, at the same time protecting the flame from air-currents, so that the heat is not dispersed or wasted. The attachment consists, essentially, of a short pipe or chimney intended to surround the flame, having at its upper end a broad laterally-projecting flange, the periphery of which is provided with an upwardly-extended rim, which serves to support the cooking or other utensil that is to be heated.

The apparatus may be made of sheet-iron, and the rim is provided with one or more recesses extending down from its upper edge to afford an opportunity for the products of combustion to escape, the said recesses or openings being covered with gauze or perforated plates, which prevent violent currents of air from entering the chamber and dispersing the heat. A deflector is provided a short distance above the top of the chimney, causing the flame and heat to be spread around in the chamber formed between the flange, the rim, and the utensil supported thereon.

Figure 1 is a side elevation of an attachment embodying this invention, and Fig. 2 a vertical section thereof.

The attachment consists, essentially, of a pipe or chimney, $a$, to surround the flame and protect it from air-currents, and at the same time direct the heated gases upward, the said chimney having at its upper end a flange, $b$, of about the size of the utensils with which the apparatus is to be used. The said flange $b$ is provided with an upwardly-projecting rim, $c$, which, with the said flange, forms a shallow chamber for the flame and heated gases, and the said rim is provided with recesses or openings $d$, (see Fig. 1,) extending down from its upper edge, which, when a cooking utensil is resting on the said rim, afford a vent for the heated gases contained in the space between the said utensil and the flange $b$. The said openings $d$ are preferably covered with gauze or perforated plate, as shown at $e$, which may extend wholly around the interior of the rim $c$, and which, while affording an opportunity for the passage of heated gases from the chamber, prevents the violent ingress of air-currents from the outside, which would tend to dissipate the heat and cool the cooking utensils.

In order to distribute the heat over the entire lower surface of cooking utensils, instead of having it concentrated where the flame strikes thereon, the apparatus is provided with a deflector, $f$, consisting of a flat plate supported by arms $g$ a short distance above the chimney $a$. The flame striking on the deflector $f$ is thrown outward toward the rim $c$, while a considerable portion of the heat is transmitted through the deflecting-plate $f$ to the surface above it, so that the entire under surface of the cooking utensil supported on the rim $c$ is affected with a nearly uniform heat.

The attachment forming the subject of the present invention is very simple and inexpensive in construction, and effects a great saving in fuel, and at the same time, owing to the uniformity of the distribution of the heat, produces much better results when used for cooking purposes.

I may state that I am well aware that it is common enough to employ deflectors in heating apparatus which, like mine, act as distributers, and also that wire-gauze is largely employed for the purpose I use it; but I am not aware that the attachment I have devised has ever before existed in fact or substance as I have herein shown it.

I claim—

1. The combination of the chimney, the flange at the upper end thereof, and the rim provided with recesses, as described, surrounding the said flange and serving as a support for a cooking utensil, and the deflector f, supported above the said chimney, to operate substantially as described.

2. As an improved article of manufacture, an attachment for vapor-burners, consisting of a chimney and flange at the upper end thereof, a deflector above the said chimney, and a rim surrounding the said flange, provided with openings or recesses, and a gauze or perforated plate in the said recesses, substantially as described.

In testimony whereof I have signed my name to this specification in the presence of two subscribing witnesses.

AMOS P. AVERY.

Witnesses:
J. T. BLACK,
SILA CONVERSE.